US012512453B2

(12) United States Patent
Oriani et al.

(10) Patent No.: US 12,512,453 B2
(45) Date of Patent: Dec. 30, 2025

(54) COMPOSITION FOR SECONDARY BATTERY ELECTRODES

(71) Applicant: SYENSQO SPECIALTY POLYMERS ITALY S.p.A., Bollate (IT)

(72) Inventors: Andrea Vittorio Oriani, Milan (IT); Rosita Lissette Pena Cabrera, Bergamo (IT); Julio A. Abusleme, Saronno (IT)

(73) Assignee: SYENSQO SPECIALTY POLYMERS ITALY S.p.A., Bollate (IT)

( * ) Notice: Subject to any disclaimer, the term of this patent is extended or adjusted under 35 U.S.C. 154(b) by 926 days.

(21) Appl. No.: 17/625,575

(22) PCT Filed: Aug. 3, 2020

(86) PCT No.: PCT/EP2020/071805
§ 371 (c)(1),
(2) Date: Jan. 7, 2022

(87) PCT Pub. No.: WO2021/023709
PCT Pub. Date: Feb. 11, 2021

(65) Prior Publication Data
US 2022/0293894 A1    Sep. 15, 2022

(30) Foreign Application Priority Data

Aug. 7, 2019 (EP) ..................... 19190465

(51) Int. Cl.
*H01M 4/04*   (2006.01)
*H01M 4/36*   (2006.01)
*H01M 4/505*  (2010.01)
*H01M 4/525*  (2010.01)
*H01M 4/62*   (2006.01)
*H01M 4/66*   (2006.01)
*H01M 10/0525* (2010.01)

(52) U.S. Cl.
CPC ......... *H01M 4/0404* (2013.01); *H01M 4/366* (2013.01); *H01M 4/505* (2013.01); *H01M 4/525* (2013.01); *H01M 4/623* (2013.01); *H01M 4/661* (2013.01); *H01M 10/0525* (2013.01)

(58) Field of Classification Search
CPC .... H01M 4/0404; H01M 4/366; H01M 4/505; H01M 4/525; H01M 4/623; H01M 4/661; H01M 10/0525; H01M 10/052; H01M 4/13; H01M 4/139; H01M 4/622; H01M 10/058; H01M 4/0471; H01M 4/131; H01M 4/1391
See application file for complete search history.

(56) References Cited

U.S. PATENT DOCUMENTS

| | | |
|---|---|---|
| 4,016,345 A | 4/1977 | Holmes |
| 4,725,644 A | 2/1988 | Malhotra |
| 6,479,591 B2 | 11/2002 | Kapeliouchko et al. |
| 2017/0077505 A1 | 3/2017 | Pras et al. |
| 2018/0248193 A1 | 8/2018 | Sakai et al. |

FOREIGN PATENT DOCUMENTS

| | | |
|---|---|---|
| EP | 969023 A2 | 1/2000 |
| WO | 2008129041 A1 | 10/2008 |
| WO | 2017216179 A1 | 12/2017 |
| WO | 2021023707 A1 | 2/2021 |

*Primary Examiner* — Helen Oi K Conley
(74) *Attorney, Agent, or Firm* — Osha Bergman Watanabe & Burton LLP

(57) ABSTRACT

The present invention pertains to electrode-forming compositions, to the use of said electrode-forming compositions in a process for the manufacture of electrodes, to said electrodes and to electrochemical devices such as secondary batteries comprising said electrodes.

16 Claims, No Drawings

COMPOSITION FOR SECONDARY BATTERY ELECTRODES

CROSS-REFERENCE TO RELATED APPLICATIONS

This application is a U.S. national stage entry under 35 U.S.C. § 371 of International Application No. PCT/EP2020/071805 filed Aug. 3, 2020, which claims priority to European application No. 19190465.5, filed on Aug. 7, 2019. The entire contents of these applications are explicitly incorporated herein by this reference.

TECHNICAL FIELD

The present invention pertains to electrode-forming compositions, to the use of said electrode-forming compositions in a process for the manufacture of electrodes, to said electrodes and to electrochemical devices such as secondary batteries comprising said electrodes.

BACKGROUND ART

Electrochemical devices such as secondary batteries typically comprise a positive electrode, a negative electrode, a separator and an electrolyte.

Electrodes for secondary batteries are usually produced by applying an electrode forming composition onto a metal substrate also known as "current collector". The electrode forming compositions are typically formed by mixing a binder with a powdery electro active compound and optionally other ingredients such as solvents, materials to enhance conductivity and/or control viscosity. The binder is a key component of electrodes because it must ensure good adhesion to the current collector and to the electro active compounds, thus allowing the electro active material to transfer electrons as required. Current commercial batteries typically use graphite as electro active compound in the negative electrode, and mixed oxides containing nickel and lithium as electro active compounds in the positive electrode. The electrode forming composition is typically applied on the current collector and dried. The resulting sheet is normally calendered or otherwise mechanically treated and rolled. Individual electrodes are then cut out from this sheet.

Fluoropolymers are known in the art to be suitable as binders for the manufacture of electrodes for use in electrochemical devices such as secondary batteries.

In the related art, vinylidene fluoride polymers (PVDF) have been used as electrode binder of nonaqueous electrolyte secondary batteries. Generally, PVDF homopolymer has poor adhesion to metal. In order to face this problem, several solutions have been proposed. As an example, in WO 2008/129041 it has been demonstrated that including certain recurring units derived from a (meth)acrylic monomer improves the adhesion to metal of PVDF polymers.

Nevertheless, the need still exists of electrode binders having even better adhesion.

Increasing the PVDF molecular weight is known to increase the performances of binders comprising said polymer, in particular in terms of adhesion to metals.

The molecular weight of PVDF resins can be increased by crosslinking.

Approaches of crosslinking usually involve blending a cross-linker promoter with the fluoropolymer, followed by heat treatment or treatment with ionizing radiation to give crosslinking.

As an example, EP0969023 (DUPONT THE NEMOURS AND COMPANY) discloses functionalized fluoropolymers that may be thermally crosslinked in the presence of crosslinker promoters such as polyamides, wherein the functional groups of said fluoropolymers include esters, alcohols and acids.

In a different approach, US 2018/0248193 (KUREHA CORPORATION) discloses a method of improving adhesion of fluorine based polymers to metal and to active materials in electrodes by submitting to a heat treatment an electrode obtained from an electrode forming composition comprising the active material selected from Lithium cobaltate and Lithium iron phosphate and a mixture of:
  a first fluorine based polymer including at least one side chain comprising a carboxyl group of formula —X—COOH, wherein X is an atomic group having a main chain comprising 1 to 18 carbon atoms, and
  a second fluorine based polymer having side chains including a hydroxyl group.

There is still a need in the art for both positive and negative electrodes which advantageously enable manufacturing electrochemical devices exhibiting outstanding capacity values and good adhesion to metal substrates.

The present invention addresses this need by providing a new electrode forming composition which comprises a blend of a first vinylidene fluoride polymer including certain side chains including hydroxyl groups and a second vinylidene fluoride polymer including recurring units derived from acrylic acid and which is able to show a surprising adhesion performance when used both in positive and in negative electrodes.

SUMMARY OF INVENTION

The present invention relates to an electrode forming composition (C) comprising:
  (a) at least one first fluoropolymer [polymer (FA)] comprising:
    (ai) recurring units derived from vinylidene fluoride (VDF) monomer;
    (aii) recurring units derived from at least one hydroxyl group-containing vinyl monomer (HA),
    wherein the total amount of recurring units derived from monomer (HA) in said polymer (FA) is of at most 10.0% by moles, preferably at most 5.0% by moles, more preferably at most 1.5% by moles, with respect to the total moles of recurring units of polymer (FA);
    said polymer (FA) being characterized by a fraction of randomly distributed monomer (HA) of at least 40%; and
  (b) at least one second fluoropolymer [polymer (FB)], different from polymer (FA), comprising:
    (bi) recurring units derived from vinylidene fluoride (VDF) monomer;
    (bii) recurring units derived from at least one carboxyl group-containing acrylic monomer (CA) of formula (II):

wherein:

$R_1$, $R_2$ and $R_3$, equal to or different from each other, are independently selected from a hydrogen atom and a $C_1$-$C_3$ hydrocarbon group and $R_H$ is a $C_1$-$C_{10}$ hydrocarbon chain moiety comprising at least one carboxyl group, wherein the total amount of recurring units derived from monomer (CA) in said polymer (FB) is of at most 10.0% by moles, preferably at most 5.0% by moles, more preferably at most 1.5% by moles, with respect to the total moles of recurring units of polymer (FB);

said polymer (FB) being characterized by a fraction of randomly distributed monomer (CA) of at least 40%.

(c) at least one electro-active material (AM);
(d) at least one solvent (S).

It has been found that blending a first fluoropolymer including in the backbone certain monomers bearing hydroxyl groups with a second fluoropolymer including in the backbone recurring units derived from acrylic acid provides a crosslinkable blend of fluoropolymers that can be suitably used as binders in electrode forming composition. Said crosslinkable blend of fluoropolymers can be thermally crosslinked once the electrode forming composition is casted onto the current collector in a process for preparing electrodes; the interaction between hydroxyl groups contained in the first fluoropolymer and the carboxyl group derived from acrylic acid contained in the second fluoropolymer is thus caused to occur.

This results in an electrode having improved performances, in particular in terms of adhesion to metals.

In a further aspect the present invention relates to a process for the manufacture of an electrode using an electrode forming composition (C) as described, said process comprising:

(i) providing a metal substrate having at least one surface;
(ii) providing an electrode-forming composition (C) as defined above;
(iii) applying the composition (C) provided in step (ii) onto the at least one surface of the metal substrate provided in step (i), thereby providing an assembly comprising a metal substrate coated with said composition (C) onto the at least one surface;
(iv) drying the assembly provided in step (iii).

In a further aspect the present invention relates to an electrode obtainable from such a process.

In a further aspect the present invention relates to an electrochemical device comprising said electrode.

The electrode-forming composition (C) of the present invention is particularly suitable for the manufacturing of positive electrodes for electrochemical devices.

DESCRIPTION OF EMBODIMENTS

By the term "recurring unit derived from vinylidene fluoride" (also generally indicated as vinylidene difluoride 1,1-difluoroethylene, VDF), it is intended to denote a recurring unit of formula $CF_2$=$CH_2$.

Suitable hydroxyl group-containing vinyl monomers (HA) are compounds of formula (I):

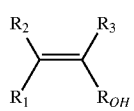

(I)

wherein:

$R_1$, $R_2$ and $R_3$, equal to or different from each other, are independently selected from a hydrogen atom, a halogen atom, and a $C_1$-$C_3$ hydrocarbon group and $R_{OH}$ is a $C_2$-$C_{10}$ hydrocarbon chain moiety comprising at least one hydroxyl group and possibly containing in the chain one or more oxygen atoms, carbonyl groups or carboxy groups.

In a preferred embodiment, monomers (HA) are compounds of formula (Ia):

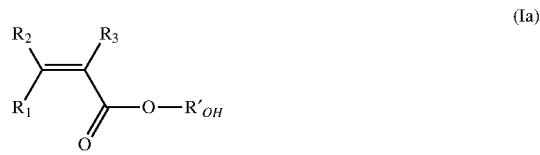

(Ia)

wherein:

$R_1$, $R_2$ and $R_3$, equal to or different from each other, are independently selected from a hydrogen atom and a $C_1$-$C_3$ hydrocarbon group and $R'_{OH}$ is a $C_1$-$C_5$ hydrocarbon moiety comprising at least one hydroxyl group.

Non-limitative examples of monomers (HA) of formula (Ia) include, notably:
hydroxyethyl(meth)acrylate (HEA),
2-hydroxypropyl acrylate (HPA),
hydroxyethylhexyl(meth)acrylate,
and mixtures thereof.

Preferably, the at least one monomer (HA) is hydroxyethyl(meth)acrylate (HEA).

Non-limitative examples of monomers (CA) of formula (II) include, notably:
acrylic acid (AA) and
(meth)acrylic acid,
and mixtures thereof.

Preferably, the at least one monomer (CA) is acrylic acid (AA).

The weight ratio between polymer (FA) and polymer (FB) in composition (C) can be comprised between 5:95 and 95:5, preferably comprised between 20:80 and 80:20.

The weight ratio between polymer (FA) and polymer (FB) in composition (C) is preferably such to allow obtaining a molar ratio between recurring units (aii) and recurring units (bii) in composition (C) comprised in the range from 20:1 to 1:20, preferably from 10:1 to 1:10.

It is essential that in polymer (FA) the fraction of randomly distributed units (HA) is of at least 40% and that in polymer (FB) the fraction of randomly distributed units (CA) is of at least 40%.

The expression "fraction of randomly distributed units (HA)" is intended to denote the percent ratio between the average number of (HA) monomer sequences (%), said sequences being comprised between two recurring units derived from VDF monomer in polymer (FA), and the total average number of (MA) monomer recurring units (%), according to the following formula:

$$\text{Fraction of randomly distributed units } (HA) = \frac{\text{average number of } (HA) \text{ sequences } (\%)}{\text{average total number of } (HA) \text{ units } (\%)} \cdot 100$$

When each of the (HA) recurring units is isolated, that is to say comprised between two recurring units of VDF monomer, the average number of (HA) sequences equal the average total number of (HA) recurring units, so the fraction of randomly distributed units (HA) in polymer (FA) is 100%: this value corresponds to a perfectly random distribution of (HA) recurring units within polymer (FA).

Thus, the larger is the number of isolated (HA) units with respect to the total number of (HA) units, the higher will be the percentage value of fraction of randomly distributed units (HA), as above described.

The expression "fraction of randomly distributed units (CA)" is intended to denote the percent ratio between the average number of (CA) monomer sequences (%), said sequences being comprised between two recurring units derived from VDF monomer in polymer (FB), and the total average number of (CA) monomer recurring units (%), according to the following formula:

$$\text{Fraction of randomly distributed units } (CA) = \frac{\text{average number of } (CA) \text{ sequences } (\%)}{\text{average total number of } (CA) \text{ units } (\%)} \cdot 100$$

When each of the (CA) recurring units is isolated, that is to say comprised between two recurring units of VDF monomer, the average number of (CA) sequences equal the average total number of (CA) recurring units, so the fraction of randomly distributed units (CA) in polymer (FB) is 100%: this value corresponds to a perfectly random distribution of (CA) recurring units within in polymer (FB).

Thus, the larger is the number of isolated (CA) units with respect to the total number of (CA) units, the higher will be the percentage value of fraction of randomly distributed units (CA), as above described.

Determination of total average number of (HA) monomer recurring units in polymer (FA) and of (CA) monomer recurring units in polymer (FB) can be performed by any suitable method, NMR being preferred.

The fraction of randomly distributed units (HA) and (CA) in polymer (FA) and in polymer (FB), respectively, is preferably of at least 50%, more preferably of at least 60%.

Polymer (FA) comprises preferably at least 0.05%, more preferably at least 0.2% by moles of recurring units derived from said monomer (HA).

Polymer (FA) comprises preferably at most 5.0%, more preferably at most 5.0% by moles, even more preferably at most 3.0% by moles of recurring units derived from monomer (HA).

Polymer (FB) comprises preferably at least 0.05%, more preferably at least 0.2% by moles of recurring units derived from said monomer (CA).

Polymer (FB) comprises preferably at most 7.0%, more preferably at most 5.0% by moles, even more preferably at most 3.0% by moles of recurring units derived from monomer (CA).

Excellent results have been obtained in compositions (C) with polymer (FA) and polymer (FB) each comprising at least 70% by moles of recurring units derived from VDF.

Both polymers (FA) and (FB) can independently be elastomers or semi-crystalline polymers.

Preferably, both polymer (FA) and polymer (FB) are semi-crystalline polymers.

As used herein, the term "semi-crystalline" means a fluoropolymer that has, besides the glass transition temperature Tg, at least one crystalline melting point on DSC analysis. For the purposes of the present invention a semi-crystalline fluoropolymer is hereby intended to denote a fluoropolymer having a heat of fusion determined according to ASTM D 3418 of advantageously at least 0.4 J/g, preferably of at least 0.5 J/g, more preferably of at least 1 J/g.

To the purpose of the invention, the term "elastomer" is intended to designate a true elastomer or a polymer resin serving as a base constituent for obtaining a true elastomer.

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Preferably, the intrinsic viscosity of both polymers (FA) and polymer (FB), measured in dimethylformamide at 25° C. Preferably, polymer (FA) has intrinsic viscosity between 0.05 l/g and 0.50 l/g more preferably between 0.10 l/g and 0.40 l/g and for polymer (FB) preferably between 0.15 l/g and 0.55 l/g even more preferably between 0.20 l/g and 0.50 l/g.

Both polymers (FA) and polymer (FB) may further comprise recurring units derived from one or more fluorinated comonomers (CF) different from VDF.

By the term "fluorinated comonomer (OF)", it is hereby intended to denote an ethylenically unsaturated comonomer comprising at least one fluorine atoms.

Non-limitative examples of suitable fluorinated comonomers (CF) include, notably, the followings:
(a) $C_2$-$C_8$ fluoro- and/or perfluoroolefins such as tetrafluoroethylene (TFE), hexafluoropropylene (HFP), pentafluoropropylene and hexafluoroisobutylene;
(b) $C_2$-$C_8$ hydrogenated monofluoroolefins, such as vinyl fluoride; 1,2-difluoroethylene and trifluoroethylene;
(c) perfluoroalkylethylenes of formula $CH_2=CH-R_{f0}$, wherein $R_{f0}$ is a $C_1$-$C_6$ perfluoroalkyl group;
(d) chloro- and/or bromo- and/or iodo-$C_2$-$C_6$ fluoroolefins such as chlorotrifluoroethylene (CTFE).

The fluorinated comonomer (CF) in polymer (FA) and in polymer (FB) is preferably HFP.

In one preferred embodiment, polymer (FA) and polymer (FB) are semi-crystalline.

In an embodiment according to the present invention, at least one of polymer (FA) or polymer (FB) may comprise from 0.1 to 10.0% by moles, preferably from 0.3 to 5.0% by moles, more preferably from 0.5 to 3.0% by moles of recurring units derived from said fluorinated comonomer (CF).

It is understood that chain ends, defects or other impurity-type moieties might be comprised in polymer (FA) or in polymer (FB) without these impairing their properties.

The polymer (FA) more preferably comprises recurring units derived from:
  at least 70% by moles, preferably at least 75% by moles, more preferably at least 85% by moles of vinylidene fluoride (VDF),
  from 0.05% to 3.0% by moles, preferably from 0.05% to 1.5% by moles, more preferably from 0.15% to 1.0% by moles of at least one hydroxyl group-containing vinyl monomer (HA);
  optionally from 0.5 to 3.0% by moles of recurring units derived from at least one fluorinated comonomer (CF).

The polymer (FB) more preferably comprises recurring units derived from:
  at least 70% by moles, preferably at least 75% by moles, more preferably at least 85% by moles of vinylidene fluoride (VDF), from 0.05% to 3.0% by moles, preferably from 0.05% to 1.5% by moles, more preferably from 0.15% to 1.0% by moles of at least one hydroxyl group-containing vinyl monomer (CA);

optionally from 0.5 to 3.0% by moles of recurring units derived from at least one fluorinated comonomer (CF).

The procedure for preparing polymer (FA) comprises polymerizing in an aqueous medium in the presence of a radical initiator the vinylidene fluoride (VDF) monomer, monomer (HA) and optionally comonomer (CF) in a reaction vessel, said process comprising:

continuously feeding an aqueous solution comprising monomer (HA); and maintaining the pressure in said reactor vessel exceeding the critical pressure of the vinylidene fluoride.

The procedure for preparing polymer (FB) comprises polymerizing in an aqueous medium in the presence of a radical initiator the vinylidene fluoride (VDF) monomer, monomer (CA) and optionally comonomer (CF) in a reaction vessel, said process comprising:

continuously feeding an aqueous solution comprising monomer (CA); and maintaining the pressure in said reactor vessel exceeding the critical pressure of the vinylidene fluoride.

During the whole polymerization run, pressure is maintained above critical pressure of vinylidene fluoride. Generally the pressure is maintained at a value of more than 50 bars, preferably of more than 75 bars, even more preferably of more than 100 bars.

Generally, the polymerization is carried out at a temperature comprised in the range of from 5° C. to 130° C.

Polymer (FA) and polymer (FB) may be obtained by polymerization of a VDF monomer, optionally at least one comonomer (CF), and, respectively, at least one monomer (HA) and at least one monomer (CA) either in suspension in organic medium, typically following the procedures described, for example, in WO 2008129041, or in aqueous emulsion, typically carried out as described in the art (see e.g. U.S. Pat. Nos. 4,016,345, 4,725,644 and 6,479,591).

It is essential that a continuous feeding of an aqueous solution containing either monomer (HA) or monomer (CA) is continued during the polymerization run for preparing polymer (FA) or polymer (FB), respectively.

In this way, it is possible to obtain a nearly statistic distribution of the monomer (HA) in polymer (FA) and of monomer (CA) in polymer (FB) within the VDF monomer polymer backbone of polymer.

The expressions "continuous feeding" or "continuously feeding" means that slow, small, incremental additions of the aqueous solution of monomer (HA) or of the aqueous solution of monomer (CA) take place for most of the polymerization duration, at least until the conversion of 70% by moles of the VDF monomer.

The aqueous solutions of monomer (HA) or of monomer (CA) continuously fed during polymerization amounts for at least 50% by weight of the total amount of said monomers supplied during the reaction (i.e. initial charge plus continuous feed) for the preparation of polymer (FA) or polymer (FB), respectively. Preferably at least 60% by weight, more preferably at least 70% by weight, most preferably at least 80% by weight of the total amount of either monomer (HA) or monomer (CA) is continuously fed during polymerization. An incremental addition of VDF monomer can be effected during polymerization, even if this requirement is not mandatory.

Generally, the process for preparing polymer (FA) and polymer (FB) of the invention is carried out at a temperature of at least 35° C., preferably of at least 40° C., more preferably of at least 45° C.

When the polymerization to obtain either polymer (FA) or polymer (FB) is carried out in suspension, polymers (FA) and polymers (FB) are typically provided in form of powder.

When the polymerization to obtain either polymer (FA) or polymer (FB) is carried out in emulsion, polymer (FA) and polymer (FB), typically provided in the form of an aqueous dispersion, aqueous dispersion (DA) and aqueous dispersion (DB), respectively, which may be used as directly obtained by the emulsion polymerization or after a concentration step. Preferably, the solid content of polymer (FA) and of polymer (FB) in dispersion (DA) and in dispersion (DB), respectively, is in the range comprised between 20 and 50% by weight.

Polymer (FA) and polymer (FB) obtained by emulsion polymerization can be isolated from the aqueous dispersion (DA) and dispersion (DB), respectively, by concentration and/or coagulation of the dispersion and obtained in powder form by subsequent drying.

Polymer (FA) and polymer (FB) may be optionally further extruded to provide polymer (FA) and polymer (FB) in the form of pellets.

Extrusion is suitably carried out in an extruder. Duration of extrusion suitably ranges from few seconds to 3 minutes.

Preferably, in the preparation of composition (C), polymer (FA) and polymer (FB) are added to components (b) and (c) in the form of solution in any suitable organic solvent.

Thus, polymer (FA) and polymer (FB) may be dissolved in any suitable organic solvent to provide corresponding solution (SA) and solution (SB), respectively.

Preferably, the solid content of polymer (FA) in solution (SA) and of polymer (FB) in solution (SB) is in the range comprised between 2 and 30% by weight.

Non-limitative examples of suitable organic solvents for dissolving polymer (FA) and polymer (FB) are N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate, and trimethyl phosphate, aliphatic ketones, cycloaliphatic ketones, cycloaliphatic esters. These organic solvents may be used singly or in mixture of two or more species.

The electrode forming compositions (C) of the present invention include one or more electro-active materials (AM). For the purpose of the present invention, the term "electro-active material" is intended to denote a compound which is able to incorporate or insert into its structure and substantially release therefrom alkaline or alkaline-earth metal ions during the charging phase and the discharging phase of an electrochemical device. The electro active material is preferably able to incorporate or insert and release lithium ions.

The nature of the electro active material in the electrode forming composition of the invention depends on whether said composition is used in the manufacture of a positive electrode or a negative electrode.

In the case of forming a positive electrode for a Lithium-ion secondary battery, the electro active compound is selected from lithium-containing complex metal oxides of general formula (III)

$$LiNi_xM1_yM2_zY_2 \qquad (III)$$

wherein M1 and M2 are the same or different from each other and are transition metals selected from Co, Fe, Mn, Cr and V, 0.5×1, wherein y+z=1−x, and Y denotes a chalcogen, preferably selected from O and S.

The electro active material in this embodiment is preferably a compound of formula (III) wherein Y is O. In a further preferred embodiment, M1 is Mn and M2 is Co or M1 is Co and M2 is Al.

Examples of such active materials include $LiNi_xMn_y\text{-}CoO_2$, herein after referred to as NMC, and $LiNi_xCo_yAl_zO_2$, herein after referred to as NCA.

Specifically with respect to $LiNi_xMn_yCoO_2$, varying the content ratio of manganese, nickel, and cobalt can tune the power and energy performance of a battery.

In a particularly preferred embodiment of the present invention, the compound AM is a compound of formula (III) as above defined, wherein $0.5 \leq x \leq 1$, $0.1 \leq y \leq 0.5$, and $0 \leq z \leq 0.5$.

Non limitative examples of suitable electro active materials for positive electrode of formula (III) include, notably:

$LiNi_{0.5}Mn_{0.3}Co_{0.2}O_2$,
$LiNi_{0.6}Mn_{0.2}Co_{0.2}O_2$,
$LiNi_{0.8}Mn_{0.1}Co_{0.1}O_2$,
$LiNi_{0.8}Co_{0.15}Al_{0.05}O_2$,
$LiNi_{0.8}Co_{0.2}O_2$,
$LiNi_{0.8}Co_{0.15}Al_{0.05}O_2$,
$LiNi_{0.6}Mn_{0.2}Co_{0.2}O_2$
$LiNi_{0.8}Mn_{0.1}Co_{0.1}O_2$,
$LiNI_{0.9}Mn_{0.05}Co_{0.05}O_2$.

The compounds:
$LiNi_{0.8}Co_{0.15}Al_{0.05}O_2$,
$LiNi_{0.6}Mn_{0.2}Co_{0.2}O_2$,
$LiNi_{0.8}Mn_{0.1}Co_{0.1}O_2$,
$LiNI_{0.9}Mn_{0.05}Co_{0.05}O_2$.
are particularly preferred.

In the case of forming a negative electrode for a Lithium-ion secondary battery, the electro active compounds may preferably comprise one or more carbon-based materials and/or one or more silicon-based materials.

In some embodiments, the carbon-based materials may be selected from graphite, such as natural or artificial graphite, graphene, or carbon black. These materials may be used alone or as a mixture of two or more thereof. The carbon-based material is preferably graphite.

The silicon-based compound may be one or more selected from the group consisting of chlorosilane, alkoxysilane, aminosilane, fluoroalkylsilane, silicon, silicon chloride, silicon carbide and silicon oxide. More particularly, the silicon-based compound may be silicon oxide or silicon carbide.

When present in the electro active compounds, the silicon-based compounds are comprised in an amount ranging from 1 to 60% by weight, preferably from 5 to 20% by weight with respect to the total weight of the electro active compounds.

The electrode forming compositions of the invention comprise at least one solvent (S).

The solvent for a negative electrode forming compositions may comprise and can preferably be water. This allows reducing the overall use of organic solvents with a consequent reduction of costs, reduction of flammable material and reduced environmental impact.

The solvent in positive electrode forming composition comprises one or more organic solvents, preferably polar solvents, examples of which may include: N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate, and trimethyl phosphate. These organic solvents may be used singly or in mixture of two or more species.

The electrode forming compositions of the present invention typically comprise from 0.5% by weight to 10% by weight, preferably from 0.7% by weight to 5% by weight of the sum of polymer (FA) and polymer (FB). The composition also comprises from 80% by weight to 99% by weight, of electro active material(s), all percentages being weight percentages over the total solid content of composition (C).

By the term "total solid content" it is intended "all the ingredients of the electrode forming composition of the invention excluding the solvent".

In general in the electrode forming compositions of the present invention the solvent is present in an amount of from 10% by weight to 90% by weight of the total amount of the composition. In particular, for negative electrode forming composition the solvent is preferably is present in an amount of from 25% by weight to 75% by weight, more preferably from 30% by weight to 60% by weight of the total amount of the composition (C).

For positive electrode forming compositions the solvent is preferably from 5% by weight to 60 wt %, more preferably from 15% by weight to 40% by weight of the total amount of the composition (C).

The electrode forming compositions of the present invention may further include one or more optional conductive agents in order to improve the conductivity of a resulting electrode made from the composition of the present invention. Conducting agents for batteries are known in the art.

Examples thereof may include: carbonaceous materials, such as carbon black, graphite fine powder carbon nanotubes, graphene, or fiber, or fine powder or fibers of metals such as nickel or aluminum. The optional conductive agent is preferably carbon black. Carbon black is available, for example, under the brand names, Super P® or Ketjenblack®.

When present, the conductive agent is different from the carbon-based material described above.

The amount of optional conductive agent is preferably from 0 to 30% by weight with respect to the total solids in the electrode forming composition (C). In particular, for positive electrode forming compositions the optional conductive agent is typically from 0% by weight to 10% by weight, more preferably from 0% by weight to 5% by weight with respect to the total amount of the solids within the composition (C).

For negative electrode forming compositions which are free from silicon based electro active compounds the optional conductive agent is typically from 0% by weight to 5% by weight, more preferably from 0% by weight to 2% by weight with respect to the total amount of the solids within the composition, while for negative electrode forming compositions comprising silicon based electro active compounds it has been found to be beneficial to introduce a larger amount of optional conductive agent, typically from 5% by weight to 20% by weight of the total amount of the solids within the composition (C).

The electrode forming compositions of the present invention may further include at least one acid donor that suitably acts as acidic crosslinking catalysts in the thermal crosslinking of the crosslinkable vinylidene fluoride copolymers once the electrode forming composition is applied onto the current collector in a process for preparing electrodes.

The at least one acid donor include, for example, Lewis acids, strong mineral acids, e.g., sulfuric acid, phosphoric acid, polyphosphoric acid, perchloric acid, and the like; saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted benzenesulfonic acid, and the like.

Suitable Lewis acids here are inorganic or organic metal compounds in which the cation is preferably selected from the group consisting of boron, aluminium, tin, antimony and iron.

Of the Lewis acids mentioned, particular preference is given, in particular, to metal halide Lewis acids, e.g., boron trifluoride, aluminum chloride, zinc chloride, stannous chloride, antimony trichloride, ferric chloride, boron trifluoridedimethyl ether complex, boron trifluoride-diethyl ether complex, boron trifluoride-dipropyl ether complex, and the like, with stannous chloride being particularly preferred.

The Lewis acids include not only Lewis acids themselves but also metals or metal compounds which impart a function of Lewis acid, for example oxides and sulfides, antimony trioxide ($Sb_2O_3$), zinc oxide (ZnO) and zinc sulfide (ZnS) being preferred.

In composition (C), the acid donor is preferably comprised in an amount comprised between 0.001 and 2.0% by weight, more preferably comprised between 0.005 and 0.5% by weight with respect to the total solid content of composition (C).

In an embodiment of the present invention, composition (C) comprises, preferably consists of:
(a) at least one polymer (FA) comprising recurring units derived from:
at least 70% by moles, preferably at least 75% by moles, more preferably at least 85% by moles of vinylidene fluoride (VDF),
from 0.05% to 3.0% by moles, preferably from 0.15% to 1.5% by moles, more preferably from 0.2% to 1.0% by moles of at least one hydroxyl group-containing vinyl monomer (HA);
optionally from 0.5 to 3.0% by moles of recurring units derived from at least one fluorinated comonomer (CF);
said polymer (FA) being characterized by a fraction of randomly distributed monomer (HA) of at least 40%; and
(b) at least one polymer (FB) comprising recurring units derived from:
at least 70% by moles, preferably at least 75% by moles, more preferably at least 85% by moles of vinylidene fluoride (VDF),
from 0.05% to 3.0% by moles, preferably from 0.15% to 1.5% by moles, more preferably from 0.2% to 1.0% by moles of at least one carboxyl group-containing vinyl monomer (CA);
optionally from 0.5 to 3.0% by moles of recurring units derived from at least one fluorinated comonomer (CF);
said polymer (FB) being characterized by a fraction of randomly distributed monomer (CA) of at least 40%.
(c) at least one electro-active material (AM);
(d) at least one solvent (S);
(e) an acid donor in an amount comprised between 0.001 and 2.0% by weight, more preferably comprised between 0.005 and 0.5% by weight with respect to the total solid content of composition (C).

The electrode forming compositions of the present invention may further include at least one water scavenger.

Without wishing to be bound to by any theory, the inventors believe that the presence of at least one water scavenger may help the crosslinking reaction between the side chains of polymer (A) including hydroxyl groups and those including carboxyl group by capturing the water produced during the crosslinking and promoting the condensation reaction.

Suitable water scavengers for use in the electrode forming composition of the present invention are anhydrous alumino-silicates, Zeolites in particular.

Zeolites suitable for the purposes of the present invention comprise all those natural or synthetic, and preferably synthetic, crystalline inorganic materials having a highly ordered structure with a three-dimensional network of $SiO_4$ and $AlO_4$ tetrahedra, which are linked by common oxygen atoms.

Preferred Zeolites are those having a chemical composition in the anhydrous state corresponding to the general formula:

$$M_xD_{y/2} \cdot Al_mSi_nO_{2(m+n)}$$

wherein M and D are monovalent and bivalent ions of metals, usually alkaline or alkaline-earth metals, partly or totally exchangeable with H+ or $NH_4$ ions. In the formula, m can assume any value less than n. Putting n equal to 1, m can vary from 1 to 0.0001. In this respect, the following are suitable: synthetic aluminosilicate materials having a structure similar or analogous to natural products; aluminosilicate materials known only as synthetic and having a zeolite structure; synthetic materials based on silica, $SiO_2$, in which the molar Si/Al ratio is high, or in which Al is contained in traces, or in which aluminium is replaced by elements of which the oxides have an amphoteric character, such as Be, B, Ti, Cr, Mn, Zr, V, Sb or Fe, these materials having a highly porous crystalline structure of zeolite type. A description of the structure and properties of zeolites and a systematic classification is given in the literature by D. W. Breck in "Zeolite Molecular Sieves" published by J. Wiley & Sons, N.Y., 1973.

The Zeolites are generally used in the acidic form or in neutral alkali form.

In the Zeolites, other elements, such as B, Ga, Fe, Cr, V, As, Sb, Bi or Be or mixtures thereof may be incorporated in the framework instead of aluminum, or the silicon can be replaced by another tetravalent element, such as Ge, Ti, Zr, or Hf.

The water scavenger is preferably comprised in composition (C) in an amount comprised between 0.01% to 5% by weight preferably 0.1% to 1% by weight with respect to the total solid content of composition (C).

Composition (C) as above detailed can be prepared by a process comprising a first step of mixing with any conventional mixing technique the at least one polymer (FA) with the at least one polymer (FB).

In one embodiment of the present invention, composition (C) is prepared by first mixing polymer (FA) and polymer (FB), both in solid form, in a suitable mixer.

In another embodiment of the present invention, composition (C) is prepared by first mixing polymer (FA) and polymer (FB), both the form of solution in organic solvent, corresponding to solution (SA) and solution (SB), in a suitable mixer.

In still another embodiment of the present invention, composition (C) is prepared by first mixing polymer (FA) and polymer (FB), both the form of aqueous dispersion (DA) and dispersion (DB), respectively.

After mixing the at least one polymer (FA) with the at least one polymer (FB), the process for preparing composition (C) further includes the steps of:
adding the at least one electro-active material (AM),
optionally adding at least one conductive agent, optionally adding at least one acid donor,
optionally adding at least one water scavenger, and
adding at least one solvent (S).

The electrode-forming composition (C) of the invention can be used in a process for the manufacture of an electrode, said process comprising:
(i) providing a metal substrate having at least one surface;
(ii) providing an electrode-forming composition (C) as defined above;
(iii) applying the composition (C) provided in step (ii) onto the at least one surface of the metal substrate provided in step (i), thereby providing an assembly comprising a metal substrate coated with said composition (C) onto the at least one surface;
(iv) drying the assembly provided in step (iii).

The metal substrate is generally a foil, mesh or net made from a metal, such as copper, aluminium, iron, stainless steel, nickel, titanium or silver.

Under step (iii) of the process of the invention, the electrode forming composition is applied onto at least one surface of the metal substrate typically by any suitable procedures such as casting, printing and roll coating.

Optionally, step (iii) may be repeated, typically one or more times, by applying the electrode forming composition provided in step (ii) onto the assembly provided in step (iv).

Step (iv) can be suitably carried out at a temperature comprised between 50° C. to 200° C., preferably between 80° C. to 180° C., for from 5 min up to 48 hours, preferably between 30 min up to 24 hours.

Under step (iv) a thermal crosslinking involving reaction of at least a portion of the hydroxyl groups of recurring units derived from monomer (HA) of polymer (FA) with at least a portion of the carboxyl groups of recurring units derived from monomer (CA) in polymer (FB) occurs.

Thanks to the crosslinking reaction between the side chains of polymer (FA) including hydroxyl groups and the side chains of polymer (FB) including carboxyl group, the adhesion between the binder and the electrode active material contained in the electrode, along with the adhesion between the binder and the current collector, is improved.

Accordingly, compared with methods using special additives, methods involving complicated steps, and the like, adhesion can be more easily improved.

The assembly obtained at step (iv) may be further subjected to a compression step, such as a calendaring process, to achieve the target porosity and density of the electrode.

Preferably, the assembly obtained at step (iv) is hot pressed, the temperature during the compression step being comprised from 25° C. and 130° C., preferably being of about 90° C.

Preferred target porosity for the obtained electrode is comprised between 15% and 40%, preferably from 25% and 30%. The porosity of the electrode is calculated as the complementary to unity of the ratio between the measured density and the theoretical density of the electrode, wherein:
the measured density is given by the mass divided by the volume of a circular portion of electrode having diameter equal to 24 mm and a measured thickness; and
the theoretical density of the electrode is calculated as the sum of the product of the densities of the components of the electrode multiplied by their volume ratio in the electrode formulation.

In a further instance, the present invention pertains to the electrode obtainable by the process of the invention.

Therefore the present invention relates to an electrode comprising:
a metal substrate, and
directly adhered onto at least one surface of said metal substrate, at least one layer consisting of a composition comprising:
(a) at least one first fluoropolymer [polymer (FA)] comprising:
(ai) recurring units derived from vinylidene fluoride (VDF) monomer;
(aii) recurring units derived from at least one hydroxyl group-containing vinyl monomer (HA),
wherein the total amount of monomer (HA) in said polymer (FA) is of at most 10.0% by moles, preferably at most 5.0% by moles, more preferably at most 1.5% by moles, with respect to the total moles of recurring units of polymer (FA);
said polymer (FA) being characterized by a fraction of randomly distributed monomer (HA) of at least 40%; and
(b) at least one second fluoropolymer [polymer (FB)], different from polymer (FA), comprising:
(bi) recurring units derived from vinylidene fluoride (VDF) monomer;
(bii) carboxyl group-containing acrylic monomer (CA) of formula (II):

wherein:
$R_1$, $R_2$ and $R_3$, equal to or different from each other, are independently selected from a hydrogen atom and a $C_1$-$C_3$ hydrocarbon group and $R_H$ is a $C_1$-$C_{10}$ hydrocarbon chain moiety comprising at least one carboxyl group,
wherein the total amount of monomer (CA) in said polymer (FB) is of at most 10.0% by moles, preferably at most 5.0% by moles, more preferably at most 1.5% by moles, with respect to the total moles of recurring units of polymer (FB);
said polymer (FB) being characterized by a fraction of randomly distributed monomer (CA) of at least 40%.
(b) at least one electro-active material (AM).

The layer of the electrode (E) of the invention typically has a thickness comprised between 10 μm and 500 μm, preferably between 50 μm and 250 μm, more preferably between 70 μm and 150 μm The electrode-forming composition (C) of the present invention is particularly suitable for the manufacturing of positive electrodes for electrochemical devices.

The electrode of the invention is particularly suitable for use in electrochemical devices, in particular in secondary batteries, comprising said electrode.

For the purpose of the present invention, the term "secondary battery" is intended to denote a rechargeable battery. The secondary battery of the invention is preferably an alkaline or an alkaline-earth secondary battery. The secondary battery of the invention is more preferably a Lithium-ion secondary battery. An electrochemical device according to the present invention can be prepared by standard methods known to a person skilled in the art.

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit the scope of the invention.

Experimental Part

Raw Materials

Polymer FA-1: VDF-HFP (2.5% by moles)-HEA (0.4% by moles) polymer having an intrinsic viscosity of 0.117 l/g in DMF at 25° C. and a $T_{2f}$ of 154.2° C.

Polymer FB-1: VDF-AA (0.9% by moles) polymer having an intrinsic viscosity of 0.30 l/g in DMF at 25° C. and a $T_{2f}$ of 162° C., obtained as described in WO 2008/129041.

Initiator agent (TAPPI): t-amyl-perpivalate in isododecane (a 75% by weight solution of t-amyl perpivalate in isododecane), commercially available from Arkema.

Polyethylene oxide of about 600000-800000 molecular weight commercially available from Alroko under the name Alkox® E-45.

Methocell® K100, having a dynamic viscosity of 80-120 mPa·s at 20° C. in an aqueous solution at a concentration of 2% by weight, commercially available from DOW Chemical.

Active material NMC: $LiNi_{0.6}Co_{0.2}Mn_{0.2}O_2$, commercially available from Umicore SA.

Electroconductivity-imparting additive: C-NERGY™ SUPER C65 (SC-65), commercially available from Imerys Graphite & Carbon.

Determination of Intrinsic Viscosity of Polymer

Intrinsic viscosity (η) [dl/g] was measured using the following equation on the basis of dropping time, at 25° C., of a solution obtained by dissolving either polymer (FA) or polymer (FB) in N,N-dimethylformamide at a concentration of about 0.2 g/dl using a Ubbelhode viscosimeter:

$$[\eta] = \frac{\eta_{sp} + \Gamma \cdot \ln \eta_r}{(1 + \Gamma) \cdot c}$$

where c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r-1$, and $\Gamma$ is an experimental factor, which for polymers (FA) and (FB) corresponds to 3.

DSC Analysis

DSC analyses were carried out according to ASTM D 3418 standard; the melting point ($T_{f2}$) was determined at a heating rate of 10° C./min.

Preparation of Polymer FA-1: VDF-HFP-HEA

In a 80 liters reactor equipped with an impeller running at a speed of 250 rpm were introduced in sequence 49815 g of demineralised water and 0.15 g/Mni (initial amount of monomers added in reactor before the set point temperature) of METHOCEL® K100 GR and 0.6 g/KgMni of Alkox® E-45 as suspending agents. The reactor was purged with sequence of vacuum (30 mmHg) and purged of nitrogen at 20° C. Then 5.5 g/Mni of a 75% by weight solution of t-amyl perpivalate initiator in isododecane. The speed of the stirring was increased at 300 rpm. Finally, 16.34 g of hydroxyethylacrylate (HEA) and 2555 g of hexafluoropropylene (HFP) monomers were introduced in the reactor, followed by 22786 g of vinylidene fluoride (VDF) were introduced in the reactor. The reactor was gradually heated until a set-point temperature at 55° C. and the pressure was fixed at 120 bar. The pressure was kept constantly equal to 120 bars by feeding 17.4 kg of an aqueous solution containing a 187.9 g of HEA during the polymerization. After this feeding, no more aqueous solution was introduced. Then, the polymerization was stopped after 4 hours and 38 minutes by degassing the reactor until reaching atmospheric pressure. A conversion around 81% of monomers was obtained. The polymer so obtained was then recovered, washed with demineralised water and oven-dried at 65° C.

General Preparation of the Electrodes

In order to compare the adhesion behaviour of polymer FB-1 to that of blends of polymer FA-1 and FB-1, compositions were prepared by pre-mixing for 10 minutes in a centrifugal mixer 14.9 g of a 8% by weight solution of a polymer FB-1 or polymer blend composed by FB-1 and FA-1 in a 80:20 ratio in NMP, in the presence of 115.4 g of NMC, 2.4 g of SC-65 and 21.9 g of NMP.

The mixtures were then mixed using a high speed disk impeller at 2000 rpm for 1 hour. Positive electrodes were obtained by casting the so obtained compositions on 20 µm thick Al foil with a doctor blade and drying the coating layers so obtained in a vacuum oven at temperature of 130° C. for about 70 minutes. The thickness of the dried coating layers was about 110 µm.

The positive electrodes so obtained had the following composition: 97% by weight of NMC, 1% by weight of polymer (either FA-1 or the blend composed by FA-1 and FB-1 in a 80:20 ratio), 2% by weight of conductive additive.

Adhesion Peeling Force Method

Peeling tests were performed on the electrodes prepared as above described, with the setup described in the standard ASTM D903 at a speed of 300 mm/min at 20° C. in order to evaluate the adhesion of the dried coating layer to the Al foil. The results are shown in Table 1.

TABLE 1

| polymer | Adhesion [N/m] | Normalized Adhesion [%] |
|---|---|---|
| FB-1 | 17.1 | 100 |
| Blend 80/20 FB-1/FA-1 | 29.1 | 170 |

In view of the above, it has been found that the electrodes prepared by using the polymer blend composed by FB-1 and FA-1 in a 80:20 ratio have a much higher adhesion to metal foil than those obtained by using polymer FB-1 alone.

The invention claimed is:

1. An electrode-forming composition (C) comprising:
   (a) at least one first fluoropolymer [polymer (FA)] comprising:
      (ai) recurring units derived from vinylidene fluoride (VDF) monomer;
      (aii) recurring units derived from at least one hydroxyl group-containing vinyl monomer (HA),
   wherein the total amount of recurring units derived from monomer (HA) in said polymer (FA) is of at most 10.0% by moles, with respect to the total moles of recurring units of polymer (FA);
   said polymer (FA) being characterized by a fraction of randomly distributed monomer (HA) of at least 40%; and
   (b) at least one second fluoropolymer [polymer (FB)], different from polymer (FA), comprising:

(bi) recurring units derived from vinylidene fluoride (VDF) monomer;

(bii) recurring units derived from at least one carboxyl group-containing acrylic monomer (CA) of formula (II):

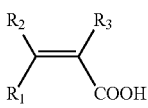

(II)

wherein:

$R_1$, $R_2$ and $R_3$, equal to or different from each other, are independently selected from a hydrogen atom and a $C_1$-$C_3$ hydrocarbon group and $R_H$ is a $C_1$-$C_{10}$ hydrocarbon chain moiety comprising at least one carboxyl group, wherein the total amount of recurring units derived from monomer (CA) in said polymer (FB) is of at most 10.0% by moles, with respect to the total moles of recurring units of polymer (FB);

said polymer (FB) being characterized by a fraction of randomly distributed monomer (CA) of at least 40%;

(c) at least one electro-active material (AM);

(d) at least one solvent(S); and wherein the molar ratio between polymer (FA) and polymer (FB) is comprised between 20:80 and 80:20.

2. The electrode-forming composition (C) according to claim 1 wherein the hydroxyl group-containing vinyl monomer (HA) is a compound of formula (I):

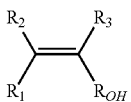

(I)

wherein:

$R_1$, $R_2$ and $R_3$, equal to or different from each other, are independently selected from a hydrogen atom, a halogen atom, and a $C_1$-$C_3$ hydrocarbon group and $R_{OH}$ is a $C_2$-$C_{10}$ hydrocarbon chain moiety comprising at least one hydroxyl group and possibly containing in the chain one or more oxygen atoms, carbonyl groups or carboxy groups.

3. The electrode-forming composition (C) according to claim 2 wherein monomer (HA) is a compound of formula (Ia):

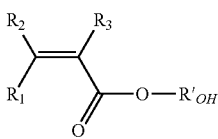

(Ia)

wherein:

$R_1$, $R_2$ and $R_3$, equal to or different from each other, are independently selected from a hydrogen atom and a $C_1$-$C_3$ hydrocarbon group and $R'_{OH}$ is a $C_1$-$C_5$ hydrocarbon moiety comprising at least one hydroxyl group.

4. The electrode-forming composition (C) according to claim 3 wherein monomer (HA) of formula (Ia) is selected from the group consisting of hydroxyethyl(meth)acrylate (HEA),
2-hydroxypropyl acrylate (HPA),
hydroxyethylhexyl(meth)acrylate,
and mixtures thereof.

5. The electrode-forming composition (C) according to claim 1 wherein the carboxyl group-containing vinyl monomer (CA) is a compound selected from acrylic acid (AA), (meth)acrylic acid, and mixtures thereof.

6. The electrode-forming composition (C) according to claim 1 wherein at least one of polymer (FA) and polymer (FB) further comprises recurring units derived from one or more fluorinated comonomers (CF) different from VDF.

7. An electrode forming composition (C) according to claim 1 comprising:

from 0.5% by weight to 10% by weight of the sum of polymer (FA) and polymer (FB);

from 80% by weight to 99% by weight, of at least one electro active material (AM) wherein all percentages are weight percentages over the total solid content of composition (C).

8. An electrode forming composition (C) according claim 1 further comprising at least one acid donor.

9. An electrode forming composition (C) according to claim 1 wherein the composition is a positive electrode forming composition, wherein said at least one electroactive material (AM) is selected from lithium-containing complex metal oxides of general formula (III)

$$LiNi_xM1_yM2_zY_2 \quad \text{(III)}$$

wherein M1 and M2 are the same or different from each other and are transition metals selected from Co, Fe, Mn, Cr and V, $0.5 \le x \le 1$, wherein $y+z=1-x$, and Y denotes a chalcogen.

10. A process for the manufacture an electrode, said process comprising:

(iv) providing a metal substrate having at least one surface;

(ii) providing an electrode-forming composition (C) according claim 1;

(iii) applying the composition (C) provided in step (ii) onto the at least one surface of the metal substrate provided in step (i), thereby providing an assembly comprising a metal substrate coated with said composition (C) onto the at least one surface;

(iv) drying the assembly provided in step (iii).

11. An electrode obtainable by the process according to claim 10 said electrode comprising:

a metal substrate, and directly adhered onto at least one surface of said metal substrate, at least one layer consisting of a composition comprising:

(a) at least one first fluoropolymer [polymer (FA)] comprising:

(ai) recurring units derived from vinylidene fluoride (VDF) monomer;

(aii) recurring units derived from at least one hydroxyl group-containing vinyl monomer (HA), wherein the total amount of recurring units derived from monomer (HA) in said polymer (FA) is of at most 10.0% by moles, with respect to the total moles of recurring units of polymer (FA);

said polymer (FA) being characterized by a fraction of randomly distributed monomer (HA) of at least 40%; and (b) at least one second fluoropolymer [polymer (FB)], different from polymer (FA), comprising:

(bi) recurring units derived from vinylidene fluoride (VDF) monomer;
(bii) recurring units derived from at least one carboxyl group-containing acrylic monomer (CA) of formula (II):

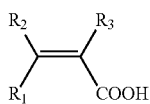

(II)

wherein:
$R_1$, $R_2$ and $R_3$, equal to or different from each other, are independently selected from a hydrogen atom and a $C_1$-$C_3$ hydrocarbon group and $R_H$ is a $C_1$-$C_{10}$ hydrocarbon chain moiety comprising at least one carboxyl group,
wherein the total amount of recurring units derived from monomer (CA) in said polymer (FB) is of at most 10.0% by moles, with respect to the total moles of recurring units of polymer (FB);
said polymer (FB) being characterized by a fraction of randomly distributed monomer (CA) of at least 40%;
(c) at least one electro-active material (AM).

12. An electrochemical device comprising at least one electrode according to claim 11.

13. An electrochemical device according to claim 12, said electrochemical device being a secondary battery comprising a positive electrode and a negative electrode, wherein at least one of the positive electrode and the negative electrode is the electrode according.

14. The electrode forming composition (C) according to claim 9 wherein M1 and M2 are different.

15. The electrode forming composition (C) according to claim 1 wherein the composition is a positive electrode forming composition, wherein said at least one electro-active material (AM) is selected from:
$LiNi_{0.5}Mn_{0.3}Co_{0.2}O_2$,
$LiNi_{0.6}Mn_{0.2}Co_{0.2}O_2$,
$LiNi_{0.8}Mn_{0.1}Co_{0.1}O_2$,
$LiNi_{0.8}Co_{0.15}Al_{0.05}O_2$,
$LiNi_{0.8}Co_{0.2}O_2$,
$LiNi_{0.8}Co_{0.15}Al_{0.05}O_2$,
$LiNi_{0.6}Mn_{0.2}Co_{0.2}O_2$
$LiNi_{0.8}Mn_{0.1}Co_{0.1}O_2$,
$LiNI_{0.9}Mn_{0.05}Co_{0.05}O_2$.

16. The electrode-forming composition (C) according to claim 1 wherein at least one of polymer (FA) or polymer (FB) may comprise from 0.1 to 10.0% by moles of recurring units derived from a fluorinated comonomer (CF), wherein fluorinated comonomer (CF) is different from VDF.

* * * * *